(12) United States Patent
Broeders et al.

(10) Patent No.: US 7,300,588 B2
(45) Date of Patent: Nov. 27, 2007

(54) WASTEWATER SEPARATOR AND METHOD OF USING SAME

(75) Inventors: Nicholas Broeders, Stroud (CA); James Mantyla, Barrie (CA); Scott Baldwin, Barrie (CA); Dan Merrington, Barrie (CA)

(73) Assignee: Canplas Industries Ltd., Barrie, Ontario (CA)

( * ) Notice: Subject to any disclaimer, the term of this patent is extended or adjusted under 35 U.S.C. 154(b) by 0 days.

(21) Appl. No.: 11/318,819

(22) Filed: Dec. 27, 2005

(65) Prior Publication Data

US 2006/0096928 A1    May 11, 2006

Related U.S. Application Data

(62) Division of application No. 09/732,299, filed on Dec. 8, 2000, now Pat. No. 7,011,752.

(30) Foreign Application Priority Data

Feb. 23, 2000    (CA) .................................... 2299134

(51) Int. Cl.
*C02F 1/40* (2006.01)
*C02F 1/24* (2006.01)
*B01D 21/02* (2006.01)
*B01D 21/24* (2006.01)

(52) U.S. Cl. ........................ 210/703; 210/801; 210/803; 210/767

(58) Field of Classification Search ................ 210/801, 210/803, 767, 703
See application file for complete search history.

(56) References Cited

U.S. PATENT DOCUMENTS

| | | | |
|---|---|---|---|
| 1,121,270 A | 12/1914 | McDermott | |
| 1,407,936 A | 2/1922 | Crosby | |
| 1,438,048 A | 12/1922 | Marsh | |
| 1,474,938 A * | 11/1923 | Marsh | 210/305 |
| 1,496,160 A | 6/1924 | Marsh | |
| 1,889,601 A | 11/1932 | Heinkel | |
| 2,058,044 A | 10/1936 | Spencer | |
| 2,076,380 A | 4/1937 | Marsh | |
| 2,102,429 A | 12/1937 | McLeod | |
| 2,138,985 A | 12/1938 | Seestedt et al. | |
| 2,140,582 A | 12/1938 | Hirshstein | |
| 2,242,139 A | 5/1941 | Munroe | |
| 2,284,737 A | 6/1942 | Hirshstein | |
| 2,338,971 A | 1/1944 | Ross | |
| 2,611,488 A | 9/1952 | Resan | |
| 2,942,733 A | 6/1960 | Thompson | |
| 3,313,795 A | 4/1967 | Rubin | |
| 3,849,311 A | 11/1974 | Jakubek | |

(Continued)

*Primary Examiner*—Thomas M. Lithgow
(74) *Attorney, Agent, or Firm*—Hoffmann & Baron, LLP

(57) ABSTRACT

A method for pretreating a wastewater stream containing grease and food particles before the stream enters a sewer includes the steps of directing said wastewater stream to a separation area; directing said wastewater stream along a preferred flow path within said separation area, said preferred flow path being sized and shaped to permit said grease to rise out of said wastewater stream; trapping said grease which rises out of said wastewater stream; extending a wastewater outlet substantially across said separation area; accelerating said remaining wastewater, carrying said food particles, through said outlet from said separation area, thereby sucking said food particles away from said separation area; and directing said wastewater and said food particles toward said sewer system.

4 Claims, 3 Drawing Sheets

U.S. PATENT DOCUMENTS

| | | |
|---|---|---|
| 4,111,805 A | 9/1978 | Van Pool et al. |
| 4,372,854 A | 2/1983 | Szereday |
| 4,385,986 A | 5/1983 | Jaisinghani et al. |
| 4,492,636 A | 1/1985 | Burke |
| 4,722,800 A | 2/1988 | Aymong |
| 4,802,978 A | 2/1989 | Schmit et al. |
| 4,940,539 A | 7/1990 | Weber |
| 4,957,633 A | 9/1990 | Suutarinen |
| 5,505,860 A | 4/1996 | Sager |
| 5,520,825 A | 5/1996 | Rice |
| 5,538,631 A | 7/1996 | Yeh |
| 5,637,221 A | 6/1997 | Coyne |

\* cited by examiner

WASTEWATER SEPARATOR AND METHOD OF USING SAME

CROSS-REFERENCE TO RELATED APPLICATIONS

This application is a divisional of application Ser. No. 09/732,299, filed Dec. 8, 2000, now U.S. Pat. No. 7,011,752, which claims the benefit of Canadian Application No. CA 2,299,134, filed Feb. 23, 2000, the contents of all of which are incorporated herein by reference.

FIELD OF THE INVENTION

This invention relates to the field of wastewater management, and, in particular, to devices known as grease traps, which are used for separating grease and oil from wastewater before permitting the wastewater to enter into a sanitary or storm sewer systems.

BACKGROUND OF THE INVENTION

Some commercial establishments, such as restaurants, produce a considerable amount of waste or drainage water which often contains high levels of grease or oil. Such contaminants can adversely affect the sewage treatment plants and can clog up the sewers. Therefore, most jurisdictions require that such grease and oil be removed from the wastewater at the commercial establishment before it is permitted to enter the sewage system. To effect such removal, a restaurant will typically provide a grease trap on its wastewater outlet line. Essentially, wastewater passes into the grease trap at one end and within the grease trap, the grease which has a lower specific gravity than water rises and forms a layer on top of the grease trap. A fluid outlet from the grease trap is positioned below the level of the grease layer to permit substantially grease free wastewater to be removed. In this way, the grease is collected in the grease trap and it may be periodically removed by direct bailing the grease out of the top of the grease trap. The grease is then disposed of as solid waste, for example, at landfill sites.

One problem with conventional grease traps is that particles of food are also present in the wastewater stream, such as bits of lettuce, meat and other waste solids. These solid waste particles have two significant effects. First, they significantly increase the volume of the waste layer collected. As a result, the grease trap becomes filled quickly and the collected waste must be removed frequently. Second, the bits of solid matter caught in the grease trap tend to decompose, anaerobically, which creates noxious gases, making the job of manually bailing the grease from the grease trap extremely unpleasant. Thus the prior art devices suffer from being both labour intensive (i.e. they fill quickly and require more frequent cleaning) and extremely unpleasant to maintain.

A number of devices for separating waste from wastewater are already known. U.S. Pat. No. 1,407,936 discloses an apparatus and method for separating matter from effluents. The apparatus includes a container which is wide at its inlet end and narrow at its outlet end. The effluent enters the container through an inlet pipe at the bottom of the container, and the effluent stream is directed upward. At that point, solid particles settle on the floor of the container, and can be removed manually through a separate valve created for that purpose. Meanwhile, the effluent stream continues through the container, and the floating waste separates from the water stream, which is directed to the outlet pipe at the opposite end of the container.

This device separates solid waste from the floating waste, such as grease, and takes the solid waste out of the effluent stream. However, the container must be manually emptied of solid waste separately from the removal of the grease. This is a time-consuming activity, and it must be done fairly frequently to prevent clogging of the inlet pipe.

U.S. Pat. Nos. 2,138,985, 3,849,311 and 4,372,854, for example, also disclose devices for separating light waste, such as oil or grease, from water. However, the devices in these patents all suffer from the problem that solid waste is trapped in the trap.

SUMMARY OF THE INVENTION

Therefore, what is desired is a device for effectively separating light waste, such as oil or grease from water. For the purpose of this invention it shall be understood that the term "light waste" shall refer to waste having a specific gravity slightly less than water and which therefore tends to rise when submerged in water. Also the term "heavy waste" shall be used to refer to waste which has a specific gravity which is greater than water, and which therefore tends to sink when placed in water. The desired device according to the present invention should also preferably function so as to prevent solid or heavy waste in the wastewater stream from being trapped in the layer of grease. Finally, the device preferably should not have to be frequently manually emptied of both solid waste and of grease.

Accordingly, in one aspect, the present invention is directed to a wastewater separator to separate waste from a mixed wastewater stream before the mixed wastewater stream is directed into a sewer system, the mixed wastewater stream including one or more of heavy waste, light waste and water. The wastewater separator comprises a separation container, a wastewater inlet to the separation container and a wastewater outlet from said separation container. The separation container comprises (1) a wastewater stream director within the separation container, the wastewater stream director being sized, shaped and positioned relative to the wastewater inlet to direct the wastewater stream along a preferred flow path to permit the light waste to separate from the wastewater stream in a first direction to a collection area and to permit the heavy waste to separate from the wastewater stream in a second direction towards a heavy waste removal area; and (2) a flow-directing outlet baffle within the separation container for directing the wastewater stream to the wastewater outlet from the heavy waste removal area to remove the heavy waste from the separation container.

Also, the wastewater separator preferably further comprises a cover detachably attachable to the container, the cover being sized and shaped to removably cover an opening on the top of the container.

The wastewater separator still further preferably comprises air entraining means associated with the wastewater inlet for entraining air into the wastewater stream.

In another aspect, the invention is directed to a wastewater separator to separate light waste from a mixed wastewater stream. The wastewater separator comprises a separation container having an inlet end and an outlet end, a wastewater inlet to the separation container, a wastewater outlet from the separation container, and air entraining means associated with the wastewater inlet to entrain air into the wastewater stream. The separation container comprises a wastewater stream director in the container sized, shaped and positioned to direct the wastewater stream along a preferred flow path which is generally diagonal across the container to facilitate separation of the light waste. The separation container further comprises a flow-directing outlet baffle in the container for directing said wastewater stream from a downstream end of the preferred flow path to the wastewater outlet.

In a further aspect the present invention provides a wastewater separator to separate light waste from a mixed wastewater stream, said wastewater separator comprising:
  a separation container having an inlet end and an outlet end;
  a wastewater inlet to said separation container;
  a wastewater outlet from said separation container; and
  air entraining means associated with said wastewater inlet to entrain air into said wastewater stream;

said separation container comprising:
  a wastewater stream director in the container, said wastewater stream director being sized, shaped and positioned to direct the wastewater stream along a preferred flow path which is generally diagonal across said container to facilitate separation of said light waste; and
  a flow-directing outlet baffle in said container for directing said wastewater stream from a downstream end of said preferred flow path to said wastewater outlet.

In a further aspect the present invention provides a method of pretreatment of a wastewater stream before said stream enters a sewer, where said wastewater stream contains grease and food particles, said method comprising the steps of:
  1) directing said wastewater stream to a separation area;
  2) directing said wastewater stream along a preferred flow path within said separation area, said preferred flow path being sized and shaped to permit said grease to rise out of said wastewater stream;
  3) trapping said grease which rises out of said wastewater stream; and
  4) directing said remaining wastewater, carrying said food particles, out of said separation area and toward said sewer system.

In a further aspect the present invention provides a method of preventing grease or oil from being carried out in wastewater from a food preparation establishment to a sewer system, said method comprising the steps of:
  1) entraining air into said wastewater stream;
  2) directing said wastewater stream to a separation area; then
  3) directing said wastewater stream along a preferred flow path within said separation area, said preferred flow path being sized and shaped to permit said grease to rise out of said wastewater stream; then
  4) permitting said grease to rise out of said wastewater stream;
  5) containing said grease within said separation area;
  6) directing said wastewater stream, carrying said food particles, out of said separation area and toward said sewer system.

BRIEF DESCRIPTION OF THE DRAWINGS

Reference will now be made, by way of example only, to the drawings of the present invention which illustrate the preferred embodiment, and in which.

DETAILED DESCRIPTION OF THE PREFERRED EMBODIMENTS

Figure 1:
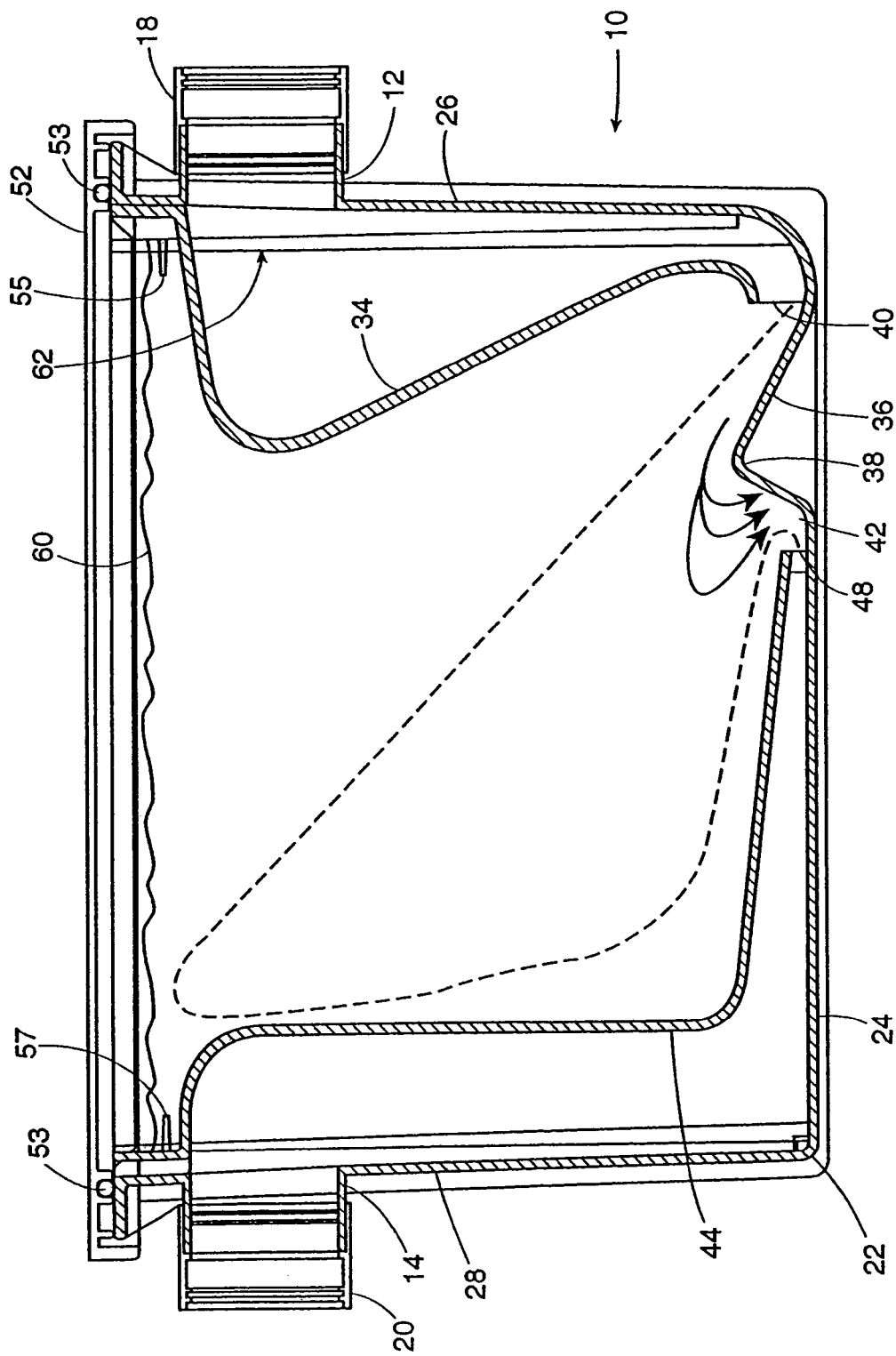
FIG. 1 is a cross-sectional elevation view of the wastewater separator.

Referring now to FIG. 1, the wastewater separator is generally designated by reference numeral 10. The wastewater separator 10 is for separating waste from a mixed wastewater stream before the disposal into a sewer system, where the mixed wastewater stream includes heavy waste, light waste and water. "Heavy waste" includes bits of solid food and any other waste with a density greater than that of water. Similarly, "light waste" is any waste in the mixed wastewater stream which has a density less than that of water, such as, for example, grease and oil. It will further be appreciated that the present invention is directed to a self-contained device which is used on an inlet to a sewer system from a commercial or industrial premises involved, typically, in food service preparation.

The wastewater separator 10 comprises a wastewater inlet 12, a wastewater outlet 14 and a separation container 22. The separation container 22 is filled with water which is the medium typically used to transport and dispose of various liquid and solid wastes and which form the bulk of the mixed wastewater stream. The mixed wastewater stream is admitted to the separation container 22 through the wastewater inlet 12, and exits from the separation container 22 through the wastewater outlet 14. As will be more particularly described below, the light waste is separated from the wastewater stream in the separation container 22, and trapped there in what is referred to as a collection area. The wastewater stream exits the separation container 22 through the wastewater outlet 14, carrying the heavy waste. As will be appreciated from the explanation which follows, the separation of the mixed wastewater stream into a collected light waste and removed heavy waste is accomplished in part by directing the wastewater stream along a preferred flow path through the separation container 22.

The wastewater inlet 12 is sized and shaped to be in water-tight communication with a wastewater pipe carrying the wastewater stream to the wastewater separator. Similarly, the wastewater outlet 14 is sized and shaped to be in water-tight communication with a further wastewater pipe which carries the wastewater stream away from the wastewater separator 10 and into a sewer.

Preferably, to achieve this water-tight communication, the wastewater inlet 12 and the wastewater outlet 14 include an inlet adaptor 18 and outlet adaptor 20, respectively, which adaptors facilitate the plumbing connection between each of the wastewater inlet 12 and outlet 14, and the wastewater pipes (not shown) which carry the wastewater stream. In the preferred embodiment, the inlet adaptor 18 and the outlet adaptor 20 are straight connections (as opposed to, say, 90° elbow connectors). However, the inlet and outlet adaptors 18 and 20 may be any shape and/or size that is necessary to achieve the water-tight connection with the wastewater pipes carrying the wastewater stream to and from the wastewater separator 10.

It will be appreciated by those skilled in the art that the wastewater inlet and outlet 12 and 14 need not include adaptors 18 and 20. Rather, any configuration is sufficient if it allows the wastewater stream to travel from the wastewater pipe through the wastewater inlet 12, and through the wastewater outlet 14 to the other wastewater pipe. So, for example, the inlet 12 and outlet 14 may simply be pipe sections, without adaptors, that are sized and shaped to be inserted directly into the wastewater pipes by pressure fit. Of course it will be appreciated by those skilled in the art that any such plumbing connection must be made in accordance with local building and safety codes. What is important is that the inlet and outlet configurations allow the wastewater stream to travel from the wastewater pipe through the wastewater inlet 12, and through the wastewater outlet 14 to the next downstream wastewater pipe for delivery to a sewer system.

In the preferred embodiment, the separation container 22 is rectangular in both vertical and horizontal cross section. Thus, the container 22 includes a substantially rectangular container floor 24, and four substantially rectangular walls 26, 28, 30 and 32 extending generally orthogonally upwardly from the edges of container floor 24 such that a closed container 22 is formed. The walls 26, 28, 30 and 32 are all of the same height. The wastewater inlet 12 extends through the upper portion of inlet wall 26 and the wastewater outlet 14 extends through the upper portion of outlet wall 28. This form is preferred because it can be molded from plastic, for example, by injection molding. Further, conventional grease traps tend to be rectangular and thus by making the instant invention rectangular as well, it can be fit into the existing space for a conventional trap as a retrofit.

The preferred size range for the container is between 10 and 20 gallons, with 12 gallons being the optimum size. This size is the volume of the container, and this volume has proved adequate for a waste stream rated at 20 gpm. It will be appreciated that the device should be large enough that it does not have to be emptied too frequently, but small enough to fit comfortably into interior building space in the back of a kitchen, storage area or the like.

It will be appreciated by those skilled in the art that a rectangular shape for the container 22 is preferred. The wastewater separator 10 will typically be located under flat floors and/or against flat walls, and the wastewater pipes will typically run parallel to those walls and/or pipes. As such, is preferred to have a container 22 whose dimensions are similarly flat so as to allow the wastewater separator 10 to fit more easily into its required location. However, as stated above, the container 22 may be any shape that allows it to hold water, and allows for the separation of light waste from the wastewater stream, without departing from the scope of the invention.

The separation container 22 further comprises a wastewater stream director within the container 22, and most preferably releasably coupled thereto in a manner hereafter described. The wastewater stream director is sized, shaped and positioned relative to the wastewater inlet to direct the wastewater stream along a preferred flow path within the container 22. In the preferred embodiment, the wastewater stream director comprises a flow-directing inlet baffle 34 attached to the wall 26 over the inlet 12 for directing the wastewater stream passing through the inlet 12 downward to the bottom of the container 22. Also provided is a separation flow director in the form of a ramp 36 immediately downstream of the baffle 34. In the most preferred form the ramp 36 is attached to, by being formed in, the container floor 24.

It will be appreciated that the wastewater stream director need not be solely in the form of the flow-directing inlet baffle 34 and the ramp 36. For example, other configurations of elements could be used to accomplish the same function, such as using the flow-directing inlet baffle 34 as the wastewater stream director. What is desired is to direct the wastewater stream along the preferred flow path, and any structure that does so can serve as the wastewater stream director.

The wastewater separator 10 further comprises a heavy waste removal area 42 which, in the preferred embodiment, comprises the portion of the bottom of the container 22 which is immediately downstream from the upper edge 38 of ramp 36.

The separation container 22 further comprises a flow-directing outlet baffle 44, in the container 22, and most preferably removably coupled thereto, for directing the wastewater stream from the heavy waste removal area 42 in the container 22 to the wastewater outlet 14. The outlet baffle inlet 48 (i.e. the inlet of the flow-directing outlet baffle 44), is preferably adjacent to and downstream from the heavy waste removal area 42, on the floor 24. It is preferable to position the outlet baffle inlet 48 as low as possible in the container 22 so as to ensure that light waste is not drawn into the outlet baffle 44 and out through the wastewater outlet 14.

The separation of the mixed wastewater stream by the present invention can now be understood. As the wastewater stream enters through the wastewater inlet 12, it contacts the flow-directing inlet baffle 34, which is sized, shaped and positioned to direct the wastewater stream downward to the bottom of the container 22. The upper portion of the flow-directing inlet baffle 34 acts as a mixing section which converts the wastewater stream to a substantially isotropic fluid. As such, air bubbles introduced at this point are permitted to adhere to the small grease droplets which have an affinity for each other. Also, the flow-directing inlet baffle 34 is sized and shaped so that, as the water strikes the inlet baffle 34 and tumbles downward, the flow of the wastewater stream becomes turbulent and air bubbles introduced at a flow control orifice are mixed into the wastewater stream. Thus, in the preferred embodiment, the flow-directing inlet baffle 34 also acts as an air entraining means, associated with the wastewater inlet 12, for entraining air into the mixed wastewater stream.

The mixed wastewater stream exits from the flow-directing inlet baffle 34 and flows along the ramp 36. Good results have been obtained with a ramp having a radiused top as shown. The combination of the flow-directing inlet baffle 34 and the ramp 36 functions to direct the wastewater stream along a preferred flow path within the container 22. As more particularly described below, the preferred flow path permits the light waste to separate from the wastewater stream in a first direction to a collection area and permits the heavy waste to separate from the wastewater stream in a second direction towards the heavy waste removal area 42.

The preferred flow path is indicated in FIG. 1 by the dotted line, and has a first section in the container 22, as well as a second section. The first section extends upward from the downstream end of the flow-directing inlet baffle 34 and away from the wastewater inlet 12. The separation of the light waste from the wastewater stream takes place in the first section. Because the light waste is of higher buoyancy than water, the light waste will rise to the collection area at the surface 60 of the water contained in the container 22. Preferably the first section of the preferred flow path will extend diagonally from the bottom of the inlet end of the container 22. Such a flow path maximizes and optimizes the flow path length and hence the time for buoyancy separation of light waste, thus enhancing the amount of separation of light waste. Also, the air bubbles that are entrained into the wastewater stream by the flow-directing inlet baffle 34 will enhance the separation of the light waste from the wastewater stream. This enhancement results from the greater buoyancy of the air bubbles, which will also tend to rise to the surface of the water, and which will thus exert a force upon the light waste in the form of grease droplets (for which the air bubbles have an affinity as noted above) and propel it to the surface.

It will be appreciated by those skilled in the art that the air entraining means can take other forms than the inlet baffle 34. For example, the air entraining means could be a separate device or machine which actively and mechanically inserts bubbles into the wastewater stream. What is important is that the air entraining means mixes air into the wastewater stream before the separation stage, so that air bubbles will be present to assist in the separation of light waste.

As the wastewater stream exits the flow-directing inlet baffle 34, the heavy waste is carried up the ramp 36 and past the upper edge 38 by the force of the current in the wastewater. At this point, the heavy waste will fall from upper edge of the ramp into the heavy waste removal area 42. The radius of the top edge is useful because it discourages turbulent flow of the liquid passing over the ramp. Turbulent flow is undesirable because it can both carry heavy waste past the heavy waste removal area and erode trapped grease from the surface, if it reaches that area. The present invention contemplates increasing the cross-sectional area and thus slowing the inlet flow stream to reduce the likelihood of turbulent flow in the separation area. This slower flow carries the heavy waste up, over and then down the far side of the ramp into the waste removal area. A more acute top edge 38 could lead to undesirable turbulence. Thus the ramp is preferably configured to encourage, as much as possible, over the design flow rates for the specific application, laminar flow up and over the ramp and then through the outlet.

The path of the heavy waste is shown by solid arrows in FIG. 1. Preferably, the flow-directing inlet baffle 34 has an outlet area which is sized and shaped to slow the wastewater stream sufficiently to permit the heavy waste to settle downward as it is gently carried along by the slow current. As can now be appreciated, as the mixed wastewater stream is slowed, the heavy waste has more time to fall, under the influence of gravity and the relative buoyancy effects, towards the bottom of the container 22. Thus, most preferably, as the heavy waste reaches the upper edge 38 of the ramp 36 it will generally be at the bottom of the container 22 and most likely in contact with the ramp 36. Similarly, the separation of light waste is facilitated, as the light waste has more time to separate from the wastewater stream due to a slower flow.

When the wastewater stream reaches the surface 60 of the water near the outlet side of the container 22, it turns and enters the second section of the preferred flow path. The second section of the preferred flow path extends downward from the downstream end of the first section, and curves back toward the outlet baffle inlet 48, because the only exit from the container 22 is through the flow-directing outlet baffle 44 to the wastewater outlet 14. As the outlet baffle inlet 48 is adjacent to the heavy waste removal area 42, the wastewater stream travels through the heavy waste removal area 42 to enter the outlet baffle inlet 48, which acts as a heavy waste collector. The outlet baffle inlet 48 is sized, shaped and positioned to remove heavy waste falling from the wastewater stream from the heavy waste removal area 42 as the wastewater stream is directed out of the container 22. As it does so, it picks up the heavy waste in the heavy waste removal area 42 and carries it through the flow-directing outlet baffle 44 to the wastewater outlet 14.

It will be appreciated by those skilled in the art that the outlet baffle inlet 48 need not be directly adjacent to the heavy waste removal area 42, nor is it necessary for the preferred flow path to extend directly through the heavy waste removal area 42. However the simplest and most preferred form of the invention allows for the suction created by the wastewater stream entering the outlet baffle inlet 48 to suck the heavy waste into the outlet baffle inlet 48. Less preferred but still feasible is to use mechanical means to push the heavy waste to the outlet baffle inlet 48. This is less preferred because it would be more expensive, more difficult to use and more likely to fail. What is important is that the preferred flow path should have a combined trajectory and flow rate that permits the heavy waste in the mixed wastewater stream to be directed to the heavy waste removal area 42.

It will also be appreciated by those skilled in the art that the preferred flow path need not be the precise flow path shown in FIG. 1. Rather any number of flow paths through the container 22 may act as the preferred flow path. What is important is that the preferred flow path be sized and shaped to permit the light waste to separate from the wastewater stream in a first direction to a collection area and to permit the heavy waste to separate from the wastewater stream in a second direction towards the heavy waste removal area 42.

Figure 3:
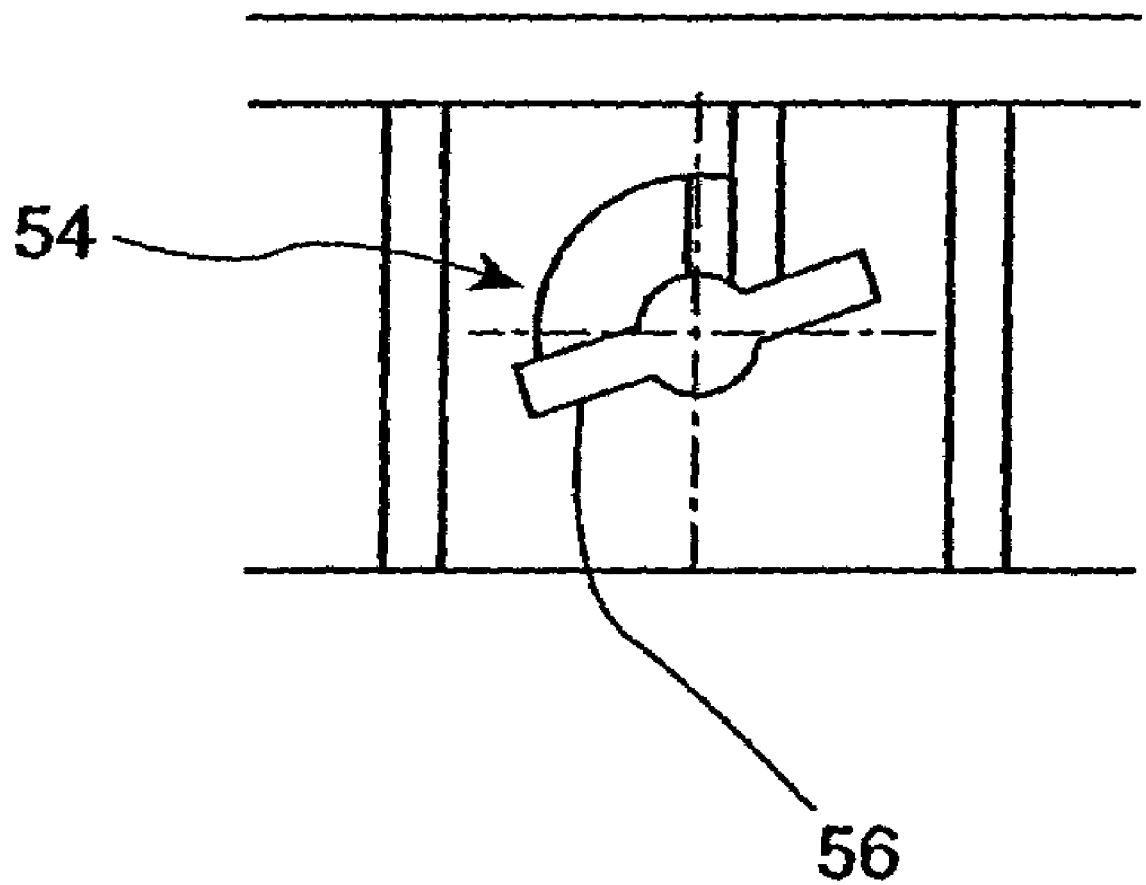
FIG. 3 shows the quarter-turn fastener described herein.

The light waste that has been separated and has floated to the surface 60 of the water in the container 22 will need to be periodically emptied. Accordingly, the wastewater separator 10 will preferably comprise a cover 52, detachably attachable to the container 22. A gasket 53 is also provided to make a good seal between the cover 52 and the container 22. Most preferably, the cover 52 will include four quarter-turn fasteners 54 at each corner of the cover 52. "Quarter-turn fastener" refers to a fastener which is sized and shaped to grip the cover 52 to the container 22 when in its closed position. However, the fastener can be moved to an open position by swivelling it approximately 90°, or a quarter turn. In the open position, the cover 52 and container 22 are not held together. As shown in FIG. 3, the quarter-turn fasteners 54 preferably have a convenient finger grip portion 56, allowing easy manipulation for quickly fastening or unfastening the cover 52. Quarter-turn fasteners are preferable because they effectively and strongly secure the cover 52 to the container 22, while still allowing the cover 52 to be quickly detached. However, it will be appreciated by those skilled in the art that quarter-turn fasteners are not specifically required for the invention. For example, the cover 52 may be detachably attachable by any suitable means, such as, for example, magnets attached to the cover 52 and container 22. It will also be appreciated that, though it is preferable for the cover 52 to be detachably attachable to the container 22, the cover 52 may be more permanently attached, such as, for example, by screws. This, however, is not preferred, since the process of emptying the wastewater separator 10 would be much more time consuming. Similarly, the cover 52 need not be attached at all (i.e. it may just rest on the container 22), though this is not preferable either, for the cover 52 may get jolted aside, and wastewater may then leak or spill from the top of the container 22.

Every so often, the entire wastewater separator 10 will need to be cleaned (as opposed to merely emptying the light waste). This cleaning would include wiping down and scouring all of the surfaces inside the container 22. To facilitate such cleaning, it is preferable that the flow-directing inlet baffle 34 and the flow-directing outlet baffle 44 be detachably attached to the container 22. In this way the baffles 34 and 44 themselves, as well as the surfaces of the container 22 behind the baffles 34 and 44, can be easily cleaned.

Most preferably, the baffles 34 and 44 will be sized and shaped so as to be slidably insertable into tracks mounted on the walls 26 and 28. The tracks secure the baffles 34 and 44 to the container 22, while allowing them to be easily withdrawn for cleaning. This withdrawal would be most preferably facilitated by a pair of inlet handles 55 on the flow-directing inlet baffle 34, and a pair of outlet handles 57 on the flow-directing outlet baffle 44. While a pair of handles on each baffle is most preferable for balancing ease of manipulation with ease of manufacture, it will be appreciated that one handle on each baffle can serve the same function. Similarly, three or more handles can also be included in order to provide a variety of possible grip points for a person withdrawing the baffles.

It will be appreciated that other means may be used to make the baffles detachably attachable to the container 22. For example, the baffles and the container 22 may both contain complementary snap fittings which allow the baffles to be snap-fitted onto the container 22. What is important is that the baffles be easily detachable from the container 22, yet be attached strongly enough attached so as not to detach during the operation of the wastewater separator 10. In the preferred embodiment, the baffles are held in position by securing the cover in place.

Figure 2:
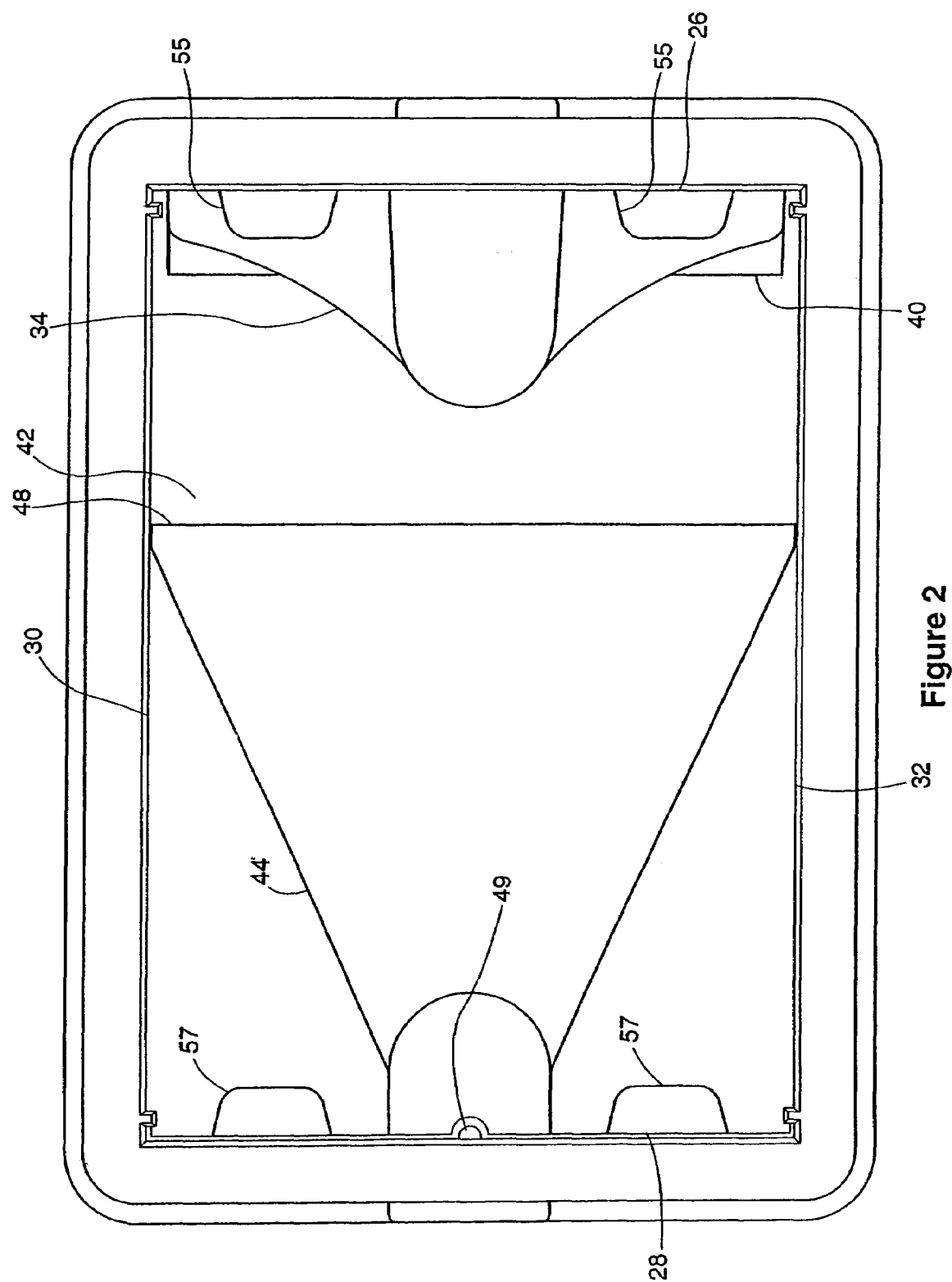
FIG. 2 is a top view of the wastewater separator.

Referring now to FIG. 2, it can be seen that in the preferred embodiment, inlet baffle inlet 62 corresponds in size to the wastewater inlet 12, which in turn corresponds in size to the wastewater pipe that carries the wastewater stream to the wastewater separator 10. As the inlet baffle 34 extends downward, it widens, so that at the inlet baffle outlet 40 the inlet baffle 34 extends substantially across the container, from wall 30 to wall 32. This configuration is preferable because it allows the entire width of the container 22 to be used for the process of waste separation. As the entire width of the container is in use for separation, the ramp 36 and the outlet baffle inlet 48 also extend substantially across the width of the container 22. The outlet baffle 44 is wide at the outlet baffle inlet 48, but small in height, compared to the outlet of the inlet baffle. This has the effect of accelerating the flow through the inlet of the outlet baffle. This encourages the heavy waste to be sucked away. The outlet baffle then changes shape as it extends upward to the wastewater outlet 14, in order to correspond in size and shape with the other wastewater pipe carrying the wastewater away from the wastewater separator 10. Also shown is an air relief valve 44 on the outlet baffle 48, which prevents suction from being able to establish a flushing action in the event of a sudden flow. Such a flushing action could cause the trap to completely empty, which is undesirable.

As discussed above, the flow-directing inlet baffle 34 is preferably sized and shaped to slow the wastewater stream as it leaves the inlet baffle 34. This is achieved by selecting the cross-sectional area of the inlet baffle 34 to be such that the flow speed of the liquid is reduced as it leaves the inlet baffle 34. Thus, the inlet baffle 34 is wide at its outlet end and of sufficient height such that the cross-sectional area produces slow, smooth preferably laminar flow out of the outlet 40. The actual size of the outlet will vary depending upon the flow rate, which will also vary with the application. Reasonable results have been achieved with an outlet cross-sectional area of between 10 and 13 square inches with about 11.6 square inches being the most preferred for a typical use of 20 gpm.

It can now be appreciated that the present invention separates the light waste from the heavy waste in a mixed wastewater stream and directs the light waste to a collection area while directing the heavy waste to a heavy waste removal area where the heavy waste is essentially automatically removed with the wastewater stream. Thus, with the present invention, the heavy waste need not be manually emptied from the wastewater separator separately from the light waste, nor does the heavy waste get trapped along with the light waste. As a result, the container does not need to be emptied as often. Also, the process of emptying the container is less unpleasant, as there is no heavy waste decomposing an aerobically in the container and releasing noxious gases.

There may be other ways of achieving the separation of the heavy waste from the mixed wastewater stream through, for example, mechanical means, without departing from the scope of the invention, but such other solutions are likely to be more complicated, more expensive and more likely to require extra maintenance. Therefore it is believed that the use of gravity, through relative buoyancy effects, and flow manipulation to slow the flow to maximize the potential for buoyancy separation of the present invention is the most preferred solution.

Referring now to FIG. 3, the quarter turn fastener 54 is shown. The fastener 54 preferably includes a finger grip portion 56 to allow for easy turning while opening and closing the fastener.

From its closed position, when the fastener is turned by about 90°, it is moved to its open position, and no longer grips the cover 52 to the container 22.

It will be appreciated by those skilled in the art that the wastewater separator 10 is used in a moist environment conducive to corrosion. Thus, the wastewater separator 10 is preferably composed of molded plastic to resist corrosion. The use of molded plastic is also preferable because it makes the wastewater separator 10 simpler and less expensive to manufacture than if metal were used. A reduction in corrosion can also be achieved through use of stainless steel, or another metal if coated to inhibit corrosion.

While the foregoing embodiments of the present invention have been set forth in considerable detail, it will be apparent to those skilled in the art that various modifications can be made to the invention without departing from the scope of the attached claims. Some of these variations are discussed above and others will be apparent to those skilled in the art. For example, the container 22 may be made of any solid material sufficiently strong to contain water in the wastewater separator 10. Also, the preferred flow path may be any flow path which permits the light waste to separate from the wastewater stream in a first direction to a collection area and permits the heavy waste to separate from the wastewater stream in a second direction towards the heavy waste removal area 42. What is considered important in this aspect of the present invention is to provide a wastewater separator which effectively separates and traps light waste from a wastewater stream, while ensuring: (1) that heavy waste is not trapped in the layer of light waste; and (2) that the heavy waste need not be emptied from the wastewater separator manually on a regular basis.

What is claim is:

1. A method of preventing grease or oil from being carried out in wastewater from a food preparation establishment to a sewer system, said method comprising the steps of:
   1) entraining air into said wastewater stream;
   2) directing said wastewater stream to a separation area, after said air entraining step;
   3) allowing said grease or oil to rise from said separation area thereby removing said grease or oil from said wastewater stream;

4) allowing food particles to settle into said separation area;
5) accelerating said wastewater stream through an outlet extending substantially to a food particle removal area, in said separation area, thereby sucking said food particles away from said separation area; and
6) directing said wastewater and said food particles toward said sewer system.

2. A method of preventing grease or oil from being carried out in wastewater from a food preparation establishment to a sewer system, said method comprising the steps of:
1) entraining air into said wastewater stream;
2) directing said wastewater stream to a separation area of a separation area, after said air entraining step; then
3) directing said wastewater stream along a preferred flow path within said separation area, said preferred flow path being sized and shaped to permit said grease to rise out of said wastewater stream in a first direction to a collection area and to permit said food particles to separate from said wastewater stream in a second direction towards a food particle removal area located in the separation area and proximate to a floor of the separation area, wherein the length of the flow path is maximized in the first direction; then
4) permitting said grease to rise out of said wastewater stream;
5) containing said grease within said separation area;
6) accelerating said wastewater stream, carrying said food particles, out of said separation area through an outlet extending substantially to the food particle removal area, in said separation area, thereby sucking said food particles away from said separation area; and
7) directing said remaining wastewater toward said sewer system.

3. The method of claim 2, said method further comprising the steps of:
providing at least one baffle detachably attached to said container for directing said wastewater stream along a preferred flow path within said separation area;
removing said at least one baffle from said container, cleaning accumulated waste from said container and said baffle, and replacing said baffle in said container.

4. The method of claim 2, wherein said first direction of said preferred flow path extends diagonally upward within said separation area.

* * * * *